United States Patent [19]
Alber et al.

[11] 3,828,249
[45] Aug. 6, 1974

[54] SELF-CORRECTING PHASE MEASURING BRIDGE

[75] Inventors: Karl Alber; Volker Seifert, both of Bremen, Germany

[73] Assignee: U.S. Philips Corporation, New York, N.Y.

[22] Filed: Feb. 12, 1973

[21] Appl. No.: 331,779

[30] Foreign Application Priority Data
Feb. 18, 1972 Germany.............................. 2207551

[52] U.S. Cl.................................. 324/57 R, 324/82
[51] Int. Cl........................ G01r 27/00, G01r 23/00
[58] Field of Search............... 324/82, 57 R; 328/155

[56] References Cited
UNITED STATES PATENTS
3,474,334  10/1969  Yokoyama et al................ 324/57 R
3,621,405  11/1971  Carlsen................................ 328/155
3,624,274  11/1971  Araki et al........................... 328/155
3,718,856  2/1973  Hendriks............................... 324/82

*Primary Examiner*—Alfred E. Smith
*Attorney, Agent, or Firm*—Frank R. Trifari; Bernard Franzblau

[57] ABSTRACT

A self-correcting phase measuring bridge is described in which the phase-correction process, apart from the phase balancing process serving for the frequency measurement, is performed fully automatically. Mechanical switches and mechanical adjusting elements for correction purposes are not required.

7 Claims, 3 Drawing Figures

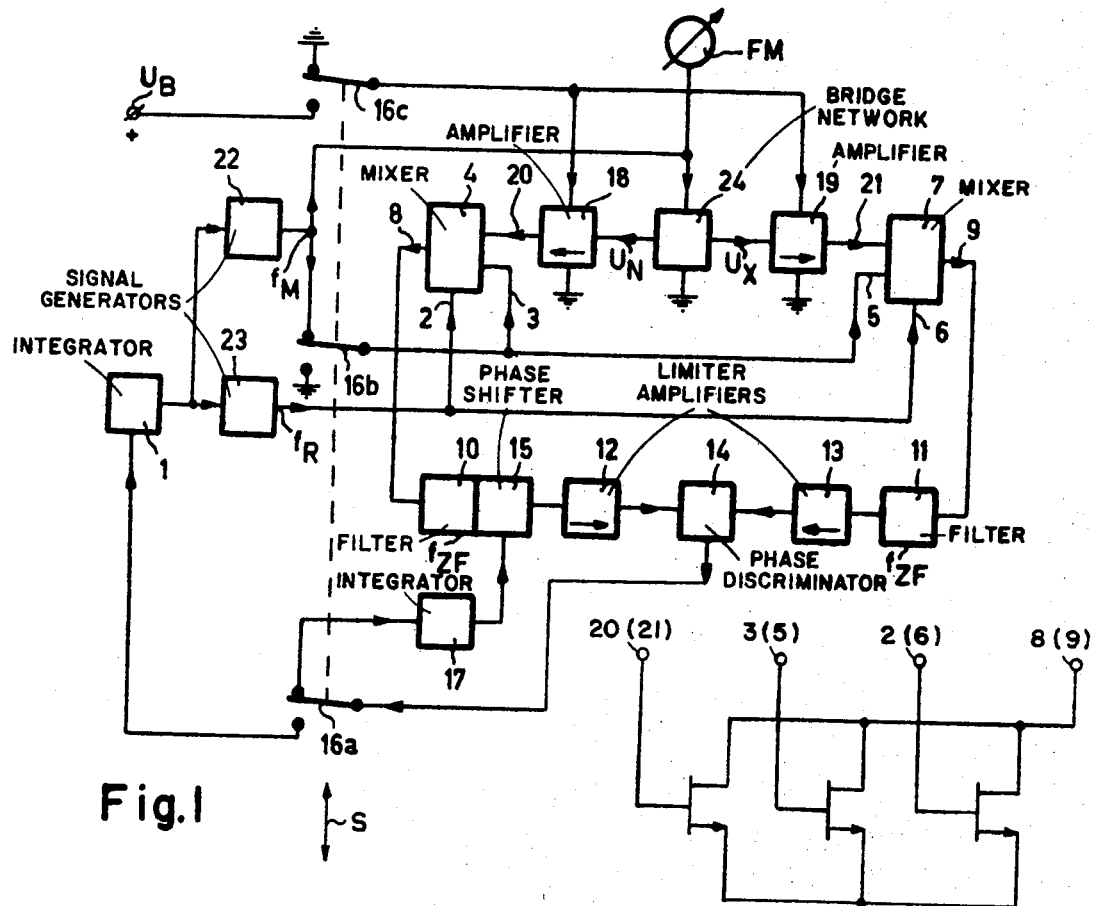
Fig.1
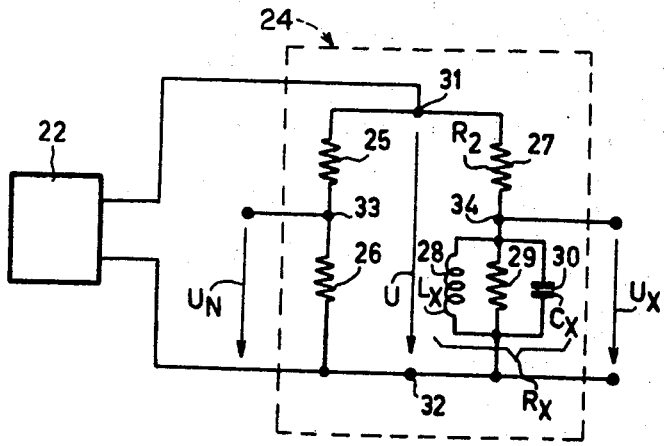
Fig.3
Fig.2

3,828,249

SELF-CORRECTING PHASE MEASURING BRIDGE

The invention relates to a self-correcting phase measuring bridge, one bridge arm of which includes a known resistance which provides information on the phase of the current and whose other bridge arm includes a complex two-terminal device to be measured, and further comprising a phase discriminator which brings about the phase balance by varying the frequency of a measuring signal.

Such a phase measuring bridge is known from Meinke/Gundlach, "Taschenbuch der Hochfrequenztechnik," 2nd ed. Berlin 1962, page 1547.

In order to increase the accuracy of the phase comparison in such measuring bridges, it is also known to convert the frequencies of the two signal voltages into a fixed frequency by mixing, thus obtaining phase information. An advantage of this process is that the phase discriminator can be operated at the fixed intermediate frequency. However, a drawback of this type of system is that band-pass filters have to be included after the mixer in order to suppress noise and side-bands. However, the band-pass filters cause a frequency-dependent phase-shift, which in the case of different design of the two branches and under the influence of ambient conditions and/or ageing of the components used, may result in a phase error. The null of the discriminator itself may also be shifted. It is known to correct such influences manually, but for this the measuring process must be interrupted and, in addition, substantial provisions have to be made in the frequency measuring arrangement, which has the form of a control loop.

German Patent Specification 720,750 furthermore describes a frequency meter using automatic compensation in which the phase relation of the current in a resonant circuit to the overall voltage is measured.

It is an object of the present invention to improve a phase measuring bridge of the type mentioned in the preamble in such a way that the phase correction process, apart from the phase balancing process used for the frequency measurement, is performed fully automatically without the use of mechanical switches and mechanical adjusting elements for correction purposes, as required, for example, in the phase and frequency discriminators according to the U.S. Pat. Nos. 3,271,675 and 3,510,769.

The invention is characterized in that during the correction process the measuring signal derived from a first controllable signal generator is applied in-phase to a first and a second mixing stage, to which the output signal derived from a second controllable signal generator is applied in-phase at the same time. The mixing products appearing on the outputs of the mixing stages are applied via a first and a second filter and a first and a second limiter amplifier, respectively, to the phase discriminator. The phase discriminator output signal, via an integrator, controls a phase shifter which is included between the first filter and the first limiter amplifier. During the measuring process the phase information for null balancing is stored in the integrator, the measuring signal of the phase discriminator being fed to another integrator whose output voltage controls the signal generators so as to obtain phase equality.

In this way the phase correction process, apart from the frequency measurement which serves for the phase balancing process, is performed automatically by time multiplexing. Correction is performed at the balancing frequency and includes the correction of phase errors in the branches consisting of mixing stages, band-pass filters and amplifiers, as well as those of the discriminator. Moreover, errors due to additional electronic HF switches in critical branches are avoided because the amplifiers provided in any case may also be employed as HF switches. Further advantages are that correction takes place under operating conditions, i.e., at the balancing frequency, and that the circuit does not influence the coupling of the measuring arrangement to the measuring object.

The invention will be described in more detail with reference to the accompanying drawings, in which:

FIG. 1 is a block diagram of an embodiment of a phase measuring bridge according to the invention, FIG. 2 is a detailed circuit diagram of a bridge circuit, and FIG. 3 is a circuit diagram of a mixer stage.

The measuring frequency $f_M$ is stored by using the storage function of an integrator 1. The signals on the inputs 3 and 5 of the mixing stages 4 and 7, respectively, which are in phase for the two branches, yield mixing products at the mixing stage outputs 8 and 9. The two signals of the frequency $f_{ZF} = f_M - f_R$ are passed through the filters 10 and 11, respectively, are each amplified in a limiter amplifier 12 and 13, respectively and are processed by a phase discriminator 14. The output signal of said phase discriminator is integrated in a further integrator 17. The output of said integrator controls a phase shifter 15, for example, by means of a capacitance diode, not shown. The closed phase control loop acts so as to obtain a null-signal voltage at the discriminator output.

After setting a switch 16a, b, c to the "measuring" position, the integrator 17 functions as a memory for the phase information for null-balancing. The switch 16c switches on the operating voltage for the two amplifiers 18 and 19. In these amplifiers the voltages $U_N$ and $U_X$ present on the opposite corner points of a bridge circuit 24 are amplified without their phase being affected and appear at the inputs 20 and 21 of the mixing stages 4 and 7, respectively. The switch 16b simultaneously disconnects the signal voltages from the inputs 3 and 5 of the mixing stages 4 and 7. The switches 16a connects the output signal of the phase discriminator 14 to the integrator 1, whose output controls the frequencies $f_M$ and $f_R = f_M - f_{ZF}$ of the two generators 22 and 23. The control loop adjusts the frequencies in such a way that the phase angles of the bridge signals $U_N$ and $U_X$ correspond.

Due to the memory function of the integrators 1 and 17, the measuring value of the balancing frequency can follow any variation of the measuring object $R_X$ in a quasi-continuous fashion, errors (for example, frequency-dependent error components of the mixing stages) being corrected simultaneously. The proposed circuit arrangement is not only suitable for frequency measurements but for any application of self-correcting phase measuring bridges.

In the circuit diagram of FIG. 2 the bridge circuit 24 includes bridge resistors 25, 26, 27 and 28, 29, 30. The bridge resistance 28, 29, 30 consists of an inductive component 28, an ohmic component 29 and a capacitive component 30 together constituting the impedance $R_X$. Diagonal points 31 and 32 are connected to the output of the generator 22, while the other two diagonal points 33 and 34 are connected to supply the voltages $U_N$ and $U_X$.

When the resistances 25, 26 and 27 are purely ohmic in the relevant frequency range, the balancing requirement for phase equality of $U_N$ and $U_X$ may be expressed by:

$$j \omega C_x + [(1)/(j \omega L_x)] = 0$$

Solving this equation in terms of frequency yields the resonant frequency of the two-terminal device under test $R_X$ $$\omega_x = 1/\sqrt{L_x C_x}$$

The resonant frequency $\omega_x$ as a frequency of the measuring signal in the balanced condition can be measured by a connected frequency meter FM.

The mixing stages may each comprise three field-effect transistors (FIG. 3) whose drain electrodes are interconnected, thus forming the output. The terminal connections for mixer 4 are shown in FIG. 3, the terminal connections for mixer 7 being shown in parentheses. The drain electrodes for mixer 4 are connected together to output terminal 8 (see FIG. 1). The source electrodes are also interconnected and are connected to a common resistor 40. The three gate connections form the inputs 20, 3 and 2, only two of which are driven at the same time. The transistor which is not used is cut off by a suitable gate-source bias (see switch 16b, FIG. 1). The use of field effect transistors in the mixer guarantees the high degree of decoupling of the inputs required in view of the parallel connection of the inputs 2 and 6 or 3 and 5.

What is claimed is:

1. A self-correcting phase measuring bridge circuit comprising a bridge network having one bridge arm which includes a known resistance element which provides phase information of the current and a second bridge arm which includes a complex impedance two terminal device to be measured, a phase discriminator for producing a phase balance by varying the frequency of a measuring signal, first and second controllable signal generators for deriving a measuring signal fm and a reference signal fr, respectively, first and second signal mixing stages, means for applying, during a correction process, the measuring signal from said first controllable signal generator in-phase to said first and second mixing stages, respectively, means for applying to said first and second mixing stages the reference signal from said second controllable signal generator in-phase at the same time, means for applying the mixing products appearing at the outputs of the mixing stages to a first and a second filter, respectively, a first and a second limiter amplifier, a phase shifter connected in cascade with the first filter and the first limiter amplifier to one input of said phase discriminator, means connecting the second limiter amplifier in cascade with the second filter to a second input of the phase discriminator, an integrator which stores phase information for null-balancing during the measuring period, means coupling the phase discriminator output signal via the integrator to the phase shifter to control said phase shifter, and means for applying the output signal of the phase discriminator to a further integrator whose output voltage controls the first and second signal generators so as to obtain phase equality.

2. A phase measuring bridge circuit as claimed in claim 1, further comprising a three-pole change-over switching device for switching between a measuring operation and a correcting operation, said switching device having a first pole for switching the output signal of the phase discriminator between the two integrators and a second pole for switching the inputs of the mixing stages between the output of the first signal generator and a point of reference potential, said switching device having a third pole for switching the output terminals of the bridge network to input terminals of said first and second mixing stages.

3. A phase-measuring bridge as claimed in claim 1 characterized in that the mixing stages each comprise three field-effect transistors having interconnected drain electrodes for forming the output, and having interconnected source electrodes connected to a common resistor and whose gate connections form the mixing stage inputs.

4. An impedance measuring bridge circuit comprising, a plurality of impedance elements connected in a bridge network with a complex impedance element to be measured, a first controlled signal generator for deriving a measuring signal and coupled to the bridge network input terminals, first and second signal mixing devices, means for selectively connecting the bridge network output terminals to respective first inputs of the first and second mixing devices, a second controlled signal generator coupled to respective second inputs of the first and second mixing devices, means for selectively applying said measuring signal in phase to respective third inputs of said first and second mixing devices simultaneously with a signal derived from the second generator applied in phase to the respective second inputs of said first and second mixing devices, first and second filters, means for applying the output signals of said first and second mixing devices to said first and second filters, respectively, a phase discriminator, variable phase shift means coupled between the first filter output and one input of the phase discriminator, means for coupling the second filter output to a second input of the phase discriminator, first and second signal integrators, means for selectively coupling the phase discriminator output to the inputs of said first and second integrators, means for coupling the output of the first integrator to a control input of said variable phase shift means, and means for coupling the output of said second integrator to said first and second signal generators to control same so as to obtain phase equality.

5. A bridge circuit as claimed in claim 4 wherein said second integrator is arranged to control the frequency of said first and second signal generators as a function of the output signal of the phase discriminator.

6. A bridge circuit as claimed in claim 4 wherein said means for selectively applying the measuring signal comprises a switching element that selectively couples said third inputs of the first and second mixing devices to a point of reference potential.

7. A bridge circuit as claimed in claim 4 wherein said selective means are operated in synchronism so that in one state the output signals of the bridge network are prevented from appearing at the first inputs of the mixing stages, the measuring signal is applied to the third inputs of the mixing stages and the phase discriminator output signal is coupled to said first integrator, said selective means having a second state in which the bridge network output signals are applied to the first inputs of the mixing stages, the measuring signal is prevented from appearing at the third inputs of the mixing stages and the phase discriminator output signal is coupled to said second integrator.

* * * * *

PO-1050
(5/69)

UNITED STATES PATENT OFFICE
CERTIFICATE OF CORRECTION

Patent No. 3,828,249   Dated   August 6, 1974

Inventor(s)  KARL ALBERT ET AL

It is certified that error appears in the above-identified patent and that said Letters Patent are hereby corrected as shown below:

IN THE TITLE PAGE below "Foreign Application Priority Data" cancel "2207551"

and insert -- P.2207551.0 --;

Signed and sealed this 22nd day of October 1974.

(SEAL)
Attest:

McCOY M. GIBSON JR.
Attesting Officer

C. MARSHALL DANN
Commissioner of Patents